United States Patent Office 3,281,267
Patented Oct. 25, 1966

3,281,267
HIGH GLOSS COATED PAPER
John C. Rice, Tenafly, N.J., assignor to Lowe Paper Company, Ridgefield, N.J., a corporation of New Jersey
No Drawing. Filed Nov. 13, 1961, Ser. No. 152,082
11 Claims. (Cl. 117—155)

This invention relates to a new coating product useful for the production of smooth, high gloss coated paper and paper products. More particularly, this invention relates to a coating product or composition useful in giving a high gloss and high brightness to paper coated therewith which is both easily printable and unusually flexible. This application is a continuation-in-part of applications for United States Letters Patent, Serial No. 295,553, filed June 25, 1952; Serial No. 362,950, filed June 19, 1953, both now abandoned; and Serial No. 574,090, filed March 27, 1956, now Patent No. 3,028,258.

In the prior art, when conventional formulations were used in the production of coated paper and paper products, many problems were encountered which were either costly and difficult, or even impossible to overcome. The prior art formulations also presented quality limitations to the final product. Some of the adverse results encountered by using the conventional formulations for making high gloss papers were, for example, uneven coating and yellowing of the coated paper, "grimming," wherein the coating composition turned cloudy, dark and had a mottled appearance. The latter resulted primarily when the treated papers were subjected to high pressures which are necessary for finishing operations, especially in the production of printable paper which requires a smooth finish and at the same time should possess an extremely high gloss and brightness. The physical property limitations encountered in case of prior art formulations include poor flexibility of the coated paper which results in a creasing and cracking of the coating upon a flexure exceeding a limited amount, lack of smoothness and attendant desirable high gloss, and undesirably low or too high ink absorbency. Accordingly, in the prior art, new coating compositions have been formulated and sought to overcome these problems but they have led to no success.

It is an object of the present invention to provide a coating composition high in fine clay and/or other pigment concentration, wherein a high gloss and smooth finish on paper or paper products is obtained.

It is a further object of the present invention to provide a high gloss and high brightness coating composition to paper and paper products which is both easily printable and flexible.

According to the present invention, it has been discovered that a new and useful coating product or composition can be obtained by employing a coating composition high in fine clay, and/or other pigment content compared to prior art coating compositions. This is accomplished by coating paper or paper products with a material containing a high clay content and/or a thermoplastic resinous component, prior to drying and brushing operations normally encountered in the paper-making art. The above treated paper can then be easily molded against a smooth, polished surface to give a high gloss and high brightness paper which is both easily printable and flexible.

One desirable property of coatings for paper and paper products of the kind described above, is high surface brightness and opacity. According to its definition, the brightness of a surface is related to the amount of light reflected from a given area. In order to obtain the possible highest light emission from a surface, it should have a light color, unless a particular other color is desired. The opacity of a coating has to be high to present a perfect optically opaque cover for the base paper or paper product. For this purpose, the coating formulation of the present invention employs 70% or more clay and/or pigment concentration.

The clay suitable for the compounding of the present paper coating compositions is preferably of the kaolinite type, and should be of a fine particle size, more specifically at least 85% of its particles being less than two microns in size. In a preferred form of the invention 100% of the particles are below 2 microns in size. White pigments such as titanium dioxide, zinc sulfide, calcium carbonate, etc., may be substituted for all or part of the clay in order to improve the opacity and brightness of the finished paper, provided 85% of the particles are less than 2 microns in size. The titanium dioxide most commonly used is a standard grade pigment having a dry brightness of 95 to 98.5 as measured by the Hunter multi-purpose reflectometer, and a particle-size of 0.3–0.4 micron.

The inclusion in the coating composition of a thermoplastic resinous component having elastomeric and plastomeric properties gives a flexible character to the coated paper product made according to this invention.

Generally speaking, the elastomeric properties of the thermosplastic component used in the present invention account primarily for the flexible character of the coated product, while the plastomeric properties render the coating composition moldable. However, it must be understood that many thermoplastic resins are both plastomeric and elastomeric, and that there is no sharp line of distinction between these properties.

The thermoplastic resins which exhibit primarily elastomeric properties may be described as rubbery polymers. This includes rubbery, homopolymers and copolymers, such as the homopolymers and copolymers of butadiene; isoprene-isobutylene copolymers and isoprene. More particularly, the rubbery polymers useful in the present invention include, but are not restricted to butadiene-styrene copolymer known as GR–S or Bunas. butadiene-acrylonitrile copolymer known as GR–N or Buna; butadiene isobutylene copolymer; or isoprene-isobutylene copolymer known as GR–I or butyl rubber; and polyisoprene which is natural rubber. Elastomeric acrylic polymers may also be used in lieu of the rubbers.

The thermoplastic resins which exhibit primarily plastomeric properties include homopolymeric and copolymeric resins. More specifically, they include vinyl polymers such as polyvinyl chloride, polyvinyl acetate, styrene resins, cellulose and cellulose derivatives such as ethyl cellulose or cellulose acetate; ethyl methacrylate, butyl methacrylate, acrylonitrile copolymers, copolymers of vinyl acetate and vinyl stearate, polyesters (glycol adipates), diglycol sebacates, ethylol propane succinates, and glycol itaconates or their co-condensation mixtures.

Those thermoplastic resins possessing the combined requisite elastomeric and plastomeric properties include polyacrylates and copolymers of polyacrylates, polyvinyl butyral, polyvinyl butyl ether, cellulose acetate-butyrate, polyester polyurethane, cellulose tri-acetate, vinyl acetate, maleic anhydride ester copolymers, styrene-maleic anhydride, polyvinyl butyrate-acetate copolymer, polyvinyl cumarones, polyvinyl carbazoles, vinylidene chloride and copolymers thereof.

The thermoplastic resinous component is preferably used in latex form, namely microscopic particles of polymer suspended in a water vehicle by the aid of emulsifying and/or stabilizing agents. Typical emulsifying agents are alkali or alkaline earth laurates, oleates or stearates, quaternary ammonium compounds, sulphonated alcohols, sulphonated mineral oils and proteins. The latices are preferably maintained in a stable condition by the addition of an alkali such as ammonium hydroxide in quantities sufficient to obtain a pH of about 8–10, to which a stabilizing agent such as casein or other proteinaceous material is added.

It is also advantageous to have a non-thermoplastic adhesive incorporated in the coating composition. The adhesives which are useful include protein type adhesives among which are casein, gelatin, soyabean, protein dextrin, etc.; vegetable adhesives, including the carbohydrate adhesives, such as starch, gum arabic, pectins, plant gums, agar-agar and cellulose derivatives; and synthetic adhesives such as polyvinyl alcohol, carboxymethyl cellulose, methyl cellulose and polydiisocyanates, and their condensation products with polyhydric alcohols, diamines or diacids. The purpose of the adhesive is to bind the pigments to the paper web and simultaneously reduce the tendecy of the coating to stick to the polished surface in the finishing product. The adhesive content may be up to 12 parts per 100 parts of pigment.

In the present coating composition it may also be advantageous to incorporate a wax, preferably a mineral wax having a melting point in the range of 100–200° F. The wax is useful in preventing adherence of the coating composition to the finishing surface during the final molding operation and facilitates the brushing, which operations are employed in the production of coated papers. The wax may be employed in the range of ½ to 10% related to the weight of the dry pigment.

The thermoplastic resinous component in the coating and the fine particle clay provides the softness that is necessary to obtain the high gloss finish of the coating. The wax serves as a lubricant to prevent dusting and scratching of the coating.

An important function of the elastomeric property of the present composition is to act as a tack regulator. While the tack is reduced, which prevents sticking to an extent, by the addition of the adhesive, the elastomeric property of the resin component renders the composition sufficiently tacky to prevent slip against the polished metal surface used in the finishing steps. In this way, the essential elements of a molding process are preserved and those of the far less efficient friction glazing are prevented. The amount of tack introduced by the elastomeric property of the resin component is sufficient to overcome the lubricating action of small amounts of wax, if such an addition is made.

The respective amounts of the various ingredients used in the coating composition of this invention will vary with the particular adhesive, if any, and the nature of thermoplastic resin component. In Table I below is outlined the range of amounts of the respective ingredients that may be used in the coating composition of this invention.

TABLE I

| | Based on 100 parts of clay and/or pigment | |
|---|---|---|
| | Operative Range, parts | Preferred Range, parts |
| Adhesive | 0–12 | 3–8 |
| Thermoplastic resin | 10–40 | 12–15 |

As noted above, it will be understood that the thermoplastic resin component having the elastomeric and plastomeric properties may consist of a single resin or a combination of resins. Where the thermoplastic resin is a mixture of an elastomer and plastomer, the respective amounts of the plastomer and elastomer will depend on the nature of the particular ingredient selected. A very hard, high softening plastomer will require more elastomer to produce the desired flexibility. A relatively soft plastomer may require little or no elastomer. Similarly, the presence of a very soft elastomer requires the addition of more plastomer, and a fairly hard elastomer may obviate the addition of the plastomer. When a combination of resins is employed, a range of about 10 to 15 parts of plastomer and 15 to 25 parts of elastomer per 100 parts of clay and/or pigment is used.

The coating composition of the present invention may be prepared by any conventional mixing method. When an adhesive such as, for example, casein is used, the casein is dissolved with a suitable solvent such as an aqueous alkaline solution. The casein solution is then added to a slurry of clay and water. The aqueous dispersion of the thermoplastic resin component is then added to the clay slurry with adequate agitation to ensure a homogeneity.

Various methods may be used for applying the novel composition of the present invention to the surface of a sheet of paper. An important factor in the finished product is the weight of the coating per unit area of the paper or paper product coated. A range of approximately 4–8 lbs. of pigment per 1000 square feet can be used as a good guide to achieve the gloss, brightness and other qualities as desired.

Accordingly, one method of applying the coating of this invention consists of first using conventional film application means, such as air knife, roll coater, etc., for a weight of coat within the range specified above. While the coating is still wet, it is brought into contact with a polished, heated surface under moderate pressure conditions. The coating is held in contact with the polished surface until the coating has dried sufficiently to be stripped away without any sticking. This type of finishing is known as casting and will leave the coated surface with a high initial gloss. After the coated stock has been stripped away from the casting surface, the coated surface can be subjected to a post-polishing or buffing operation to bring out the desired degree of gloss. The heat of the casting surface, the pressure and all the usual casting factors will vary according to the desired weight of coat range, along with the smoothness of the base stock and the speed at which the operation is being run. Usual temperatures will range as above 190–200° F. In order to achieve different results, a two-phase coating operation may be required, also depending upon various conditions of the base stock. In the case of a two-phase coating operation, the same coating composition, as used for the first coat, is applied again in form of a top coat on top of the base coat. A three-phase coating operation is also conceivable, whereby the stock is base-coated and then in a separate operation double-coated with coatings of similar formulation.

According to another method of application, the coating is dried to about a moisture content of 5 to 10% based on the total weight of paper and coating. Subsequently, the paper web is passed under a series of brushes to partially bring out the gloss in the coating. A moistening spray of water just prior to brushing is used to facilitate the subsequent finishing operation which consists of passing the paper web under a chrome plated metal drum or roller backed by a flat supporting web such as a dryer felt or metal belt subjected to sufficient tension to exert pressure against the back of the paper web. The paper web is subsequently stripped from the drum after rotating approximately 250° on its circumference. The temperature of the roller is controlled between approximately 100 and 300° F.

According to another arrangement, the paper is passed between two cooperating rollers, one of which is highly polished and chromium plated, and a resilient backing roll capable of exerting pressure in the order of 500 to 3,000 lbs. per linear inch. The temperature of the metal roll can be regulated substantially between 70 and 500° F.

Another alternative finishing method comprises the use of multiple rolls, i.e. a plurality of pairs of metal and resilient backing rolls similar to the arrangement in a calendar used in the paper and textile industry. Each of the metal rolls can be highly polished chromium plated. The coating therefore is molded in this case in a series of steps, the maximum pressure usually being applied at the last roll. In this process, lower temperatures and pressure can be applied at each of the rolls and still achieve the same high degree of gloss.

Another method of finishing the product involves the use of standard coating methods, a subsequent drying to approximately 8 to 12% moisture, followed by polishing the coated face through action of a supercalender. Subsequently the coated face is rewetted with a complete covering film of moisture containing an adhesive hardening agent, and then the re-wetted surface is immediately subjected to contact with a highly polished heated surface under a minimum of pressure. In this case, following the relief from the highly polished surface, the coated stock is subjected to a polishing operation, such as buffing, light soft brushing, etc. The above-mentioned methods all result in the desired quality of finish according to the present invention.

The variation of time, temperature and pressure according to the various methods outlined above, are partly dependent on the particular method employed, or the particular resin or combinations thereof. The required temperature can be generally related to a well-known physical characteristic of such resins, known as the second order transition temperature. (See Advances In Colloid Science, by Mark Whitney, vol. II, Interscience Publishing Co., 1946, beginning at page 2. See also an article by Wiley in Industrial and Engineering Chemistry 34, 1052–1056.)

The second order transition temperature of an amorphous thermoplastic resinous material is best determined by measuring its density as a function of temperature. An abrupt change in the slope of the density vs. temperature curve defines a second order transition point. The second order transition temperature is the temperature at which this occurs.

According to the present invention, the molding temperature employed is generally within the range between 5° F. to 35° F. above the second order transition temperature, depending on the time and pressure. At this temperature a plastic flow takes place which ceases at the moment the application of pressure is stopped. This is to be contrasted with fluid flow when the material is mobile under atmospheric or low pressures.

An important beneficial property imparted to the treated paper or paper products using the coating composition of the present invention is that of superior ink absorbency or ink receptivity. This characteristic property of a surface to be printed cannot be too low because of the required scuff resistance of the print. Furthermore, this property is also important for economical regulation of speed of printing presses. The ink absorbency cannot be too high either, it is required to stay within a preferred range.

The ink absorbency can be measured by the Dr. Case ink test, using materials made by the K & N Laboratories. This property can be expressed in a numerical form in terms of ink penetration by applying K & N ink to a small area of the paper for two minutes and then wiping dry. The Photovolt brightness search unit is then set at 100 while aimed at the unstained area and subsequently the brightness is recorded on the stained area. The difference between this brightness reading and 100 is the absorbency rating for the surface. A highly absorbent surface, when tested by this method, will show high readings. When the K & N values are low, the ink does not penetrate the surface and consequently no satisfactory bond can develop and the drying takes a long time. When the K & N values are high, i.e. the coating is too absorbent, lower ink gloss results and also poor smudge resistance due to the fact that the liquid ink bonding vehicle drained too fast from the coloring components of the ink.

The gloss of the product obtained by using the compositions of the present invention is outstandingly higher than all prior art products. This property is important, because the brightness of a surface is not a measure of its smoothness. This latter desideratum can be expressed in terms of glossiness. A non-glossy surface may still have a relatively high brightness value. The gloss can be measured by the Gardner 20° gloss-meter.

The following table shows comparative values obtained on paper products coated with the composition of the present invention and other prior art coatings. In column I, the values obtained in the case of conventional clay coating are shown. Column II contains the values obtained in case of a clay coat with a resin top coat, column III shows the values obtained on a conventional cast coating, and column IV shows the results obtained with a coating formulation of the present invention. The brightness was measured with a Photovolt brightness meter, the non-buffed and buffed gloss were measured with a Gardner 20° gloss meter.

|  | I | II | III | IV |
|---|---|---|---|---|
| Brightness | 80 | 78 | 80 | 81 |
| Non-Buffed Gloss | 10 | 30 | 25 | 60 |
| Buffed Gloss |  |  |  | 75 |
| K & N Ink Rating | 40 | 2 | 50 | 20 |

Another superior property of the paper and paper products coated with the composition of the present invention is the extreme degree of flexibility without any cracking of the surface. This property is not quantitatively expressed but it is readily apparent when compared to papers coated with prior art compositions. The paper products coated with the compositions described herein are capable of being folded back on themselves and creased without any cracking in the coating.

Several compositions of the present invention are listed in the following examples. The composition of Example IX was applied by the previously described process wherein the coated stock is dried and subsequently passed through finishing rollers. Without subsequent buffing a gloss rating of 60, with buffing a gloss rating of 75 was obtained, as measured by the Gardner 20° gloss meter.

The same composition was applied to paper stock, brushed and then rolled, yielding a gloss rating of 70.

The composition of Example VIII was applied to paper stock, dried, recoated and then it was subject to the finishing operation described above, wherein the wet coating was contacted by a highly polished heated drum, which has been previously precoated with a release and adhesive agent. Subsequently the coating was buffed. The resulting gloss value of the thus finished coat had a gloss rating of approximately 57.

As shown above, a gloss rating better than 50 as measured on the Gardner 20° gloss meter can be accomplished by using a coating composition of the present invention.

EXAMPLES

*Example I*

3 parts of casein are dissolved with 0.75 part Borax in 35 parts of water. This casein solution is then added to an aqueous clay slurry containing 70 parts kaolin clay, wherein 90% of the particles are below 2 microns in size, and 30 parts titanium dioxide. To this casein-clay slurry is added with 15 parts (dry weight) of polybutyl methacrylate latex with sufficient agitation to form a homogeneous mixture.

*Example II*

8 parts of casein are dissolved with an alkaline substance, such as Borax or ammonium hydroxide in water.

This casein solution is then added to an aqueous clay slurry containing 80 parts clay and 20 parts titanium dioxide, the total amount of water being 120 parts. To this casein-clay slurry, 12 parts (dry weight) polybutylmethacrylate latex are added with sufficient agitation to form a homogeneous mixture.

*Example III*

8 parts casein are dissolved with an alkaline substance (Borax) in water. This casein solution is then added to an aqueous clay slurry containing 80 parts of clay and 20 parts of titanium dioxide, the total amount of water being 120 parts. To this casein-clay slurry, 6 parts (dry weight) butadiene-styrene copolymer latex and 6 parts (dry weight) polyvinyl chloride are added with sufficient agitation to form a homogeneous mixture.

*Example IV*

5 parts of gelatin are dissolved in 45 parts of water. This gelatin solution is then added to an aqueous solution containing 70 parts kaolin clay, wherein 100% of the particles are below 2 microns, and 30 parts of titanium dioxide. To this gelatin-clay slurry are added 5 parts polyethyl methacrylate (dry weight) and 25 parts butadiene-styrene copolymer (dry weight) with sufficient agitation to form a homogeneous mixture.

In place of the gelatin in Example IV, soyabean protein may be used. Also in place of polyethyl methacrylate the following plastomers may be used: butylmethacrylate-acrylonitrile or polyvinyl acetate.

*Example V*

8 parts of starch are dissolved in 25 parts of water. This starch solution is added to an aqueous solution containing 70 parts kaolin clay wherein 100% of the particles are below 2 microns and 30 parts titanium dioxide. To this starch-clay solution are added 5 parts polyvinyl butyral latex (dry weight) and 10 parts polybutadiene-acrylonitrile (dry weight) latex with sufficient agitation to form a homogeneous mixture.

Soyabean protein, carboxymethylcellulose, polyvinyl alcohol or casein may be used in place of starch in Example V. Polyethyl methacrylate, polybutyl methacrylate, polyhexyl methacrylate may be used in place of polyvinyl butyral. Polybutadienestyrene, polybutadiene-isoprene, polybutadiene-isobutylene, or butyl rubber may be used in place of polybutadiene-acrylonitrile.

*Example VI*

10 parts of casein were dissolved in 70 parts of water. This casein solution is added to an aqueous solution containing 60 parts of kaolin clay wherein 95% of the particles are below 2 microns in size, and 40 parts of calcium carbonate. To this casein-clay slurry are added 5 parts ethyl methacrylate (dry weight) and 5 parts polybutadiene styrene (dry weight) with sufficient agitation to form a homogeneous mixture.

In place of the casein the following adhesives may be used in Example VI: soyabean protein, starch, polyvinyl alcohol. Zinc sulfide or magnesium carbonate may be used in place of the calcium carbonate. Polyvinyl chloride, polyvinyl butyral or polyvinyl acetate may be used in place of polyethyl methacrylate, and butyl rubber or polyisobutylene may be used in place of polybutadiene styrene.

*Example VII*

To an aqueous solution containing 70 parts kaolin, wherein 100% of the particles are below 2 microns, 30 parts titanium dioxide and 20 parts ethyl acrylate (dry weight) were added with sufficient agitation to form a homogeneous mixture.

*Example VIII*

3 parts of casein were dissolved with 0.75 part Borax in 35 parts of water. This casein solution is added to an aqueous clay slurry containing 70 parts kaolin clay, wherein 90% of the particles are below 2 microns in size, and 30 parts titanium dioxide. To this casein-clay slurry 12 parts ethyl acrylate and 3 parts paraffin wax are added with sufficient agitation to form a homogeneous mixture.

*Example IX*

| | |
|---|---|
| Kaolin clay | 75 parts. |
| Titanium dioxide | 25 parts. |
| Butadiene styrene acrylonitrile | 6.0 (added as 40% latex). |
| Butyl methacrylate | 7.0 (added as 40% latex). |
| Casein | 6.0 (added as 13% sol). |
| Ultramarine blue | 0.2. |
| Water | 10.0 gal. |

*Example X*

| | Parts |
|---|---|
| Kaolin clay (100% below 2 microns) | 70 |
| Titanium dioxide | 30 |
| Butyl methacrylate | 15 |
| Casein | 5 |
| Paraffin wax | 5 |
| Water | 150 |

While the invention has been described with reference to specific embodiments and examples, it will be apparent to those skilled in the art that various modifications may be made and equivalent substituted therefore without departing from the principles and scope of the invention as set forth in the appended claims.

What I claim is:

1. A high gloss smooth finish flexible and printable paper product having a gloss rating of at least 50 as measured by a Gardner 20° gloss meter, said product being coated with a coating composition comprising at least 70% pigment, having incorporated therein a thermoplastic resin component having elastomeric and plastomeric properties comprising at least one of the following:

(a) a member selected from the group consisting of polyacrylates and copolymers of polyacrylates, polyvinyl butyral, polyvinyl butyl ether, cellulose acetate-butyrate, polyester polyurethane, cellulose tri-acetate, vinyl acetate, maleic anhydride ester copolymers, styrene-maleic anhydride, polyvinyl butyrate-acetate copolymer, polyvinyl cumarones, polyvinyl carbazoles, vinylidene chloride and copolymers thereof; and (b) a mixture of (1) at least one elastomer selected from the group consisting of copolymers of butadiene and styrene, butadiene and acrylonitrile, butadiene and isobutylene, isoprene and isobutylene, polyisoprene and elastomeric acrylic polymers; and (2) at least one plastomer selected from the group consisting of polyvinyl chloride, polyvinyl acetate, polystyrene, copolymers of vinyl acetate and vinyl stearate, ethylcellulose, cellulose acetate, poly(ethyl methacrylate), poly(butyl methacrylate), poly(acrylonitrile), poly(glycol adipate), poly(diglycol sebacate), poly(ethylol propane succinate), poly(glycol itaconate);

said pigment having at least 85% of its particles below two microns in size.

2. A high gloss, smooth finish, flexible and printable paper product having a gloss rating of at least 50 as measured by a Gardner 20° gloss meter, and a K & N Ink rating of the order of 20 as measured by the Dr. Case Ink Test, said product being coated by a coating composition comprising at least 70% pigment, said pigment having at least 85% of its particles below two microns, said coating composition having incorporated therein a thermoplastic resin having elastomeric and plastomeric properties comprising at least one of the following:

(a) a member selected from the group consisting of polyacrylates and copolymers of polyacrylates, polyvinyl butyral, polyvinyl butyl ether, cellulose acetate-butyrate, polyester polyurethane, cellulose tri-acetate, vinyl acetate, maleic anhydride ester copolymers, styrene-maleic anhydride, polyvinyl butyrate-acetate copolymer, polyvinyl cumarones, polyvinyl carbazoles, vinylidene chloride and copolymers thereof; and (b) a mixture of (1) at least one elastomer selected from the group consisting of copolymers of butadiene and styrene, butadiene and acrylonitrile, butadiene and isobutylene, isoprene and isobutylene, polyisoprene and elastomeric acrylic polymers; and (2) at least one plastomer selected from the group consisting of polyvinyl chloride, polyvinyl acetate, polystyrene, copolymers of vinyl acetate and vinyl stearate, ethylcellulose, cellulose acetate, poly(ethyl methacrylate), poly(butyl methacrylate), poly(acrylonitrile), poly(glycol adipate), poly(diglycol sebacate), poly(ethylol propane succinate), poly(glycol itaconate);
and a non-thermoplastic adhesive.

3. A product according to claim 2 wherein said pigment is selected from the group consisting of clay, titanium dioxide, zinc sulfide and calcium carbonate.

4. A product according to claim 2 wherein said thermoplastic resin component is present in an amount within the range of 12–15 parts per 100 parts of said pigment, and said non-thermoplastic adhesive is present in an amount within the range of from 3 to 8 parts per 100 parts of said pigment.

5. A high gloss, smooth finish, flexible and printable paper product having a gloss rating of at least 50 as measured by a Gardner 20° gloss meter, and a K & N Ink rating of the order of 20 as measured by the Dr. Case Ink Test, said product being coated by a coating composition comprising a composition having at least 70% clay wherein 85% of the particles of said clay are less than two microns in size, a thermoplastic resin having elastomeric and plastomeric properties comprising at least one of the following:

(a) a member selected from the group consisting of polyacrylates and copolymers of polyacrylates, polyvinyl butyral, polyvinyl butyl ether, cellulose acetate-butyrate, polyester polyurethane, cellulose tri-acetate, vinyl acetate, maleic anhydride ester copolymers, styrene-maleic anhydride, polyvinyl butyrate-acetate copolymer, polyvinyl cumarones, polyvinyl carbazoles, vinylidene chloride and copolymers thereof; and (b) a mixture of (1) at least one elastomer selected from the group consisting of copolymers of butadiene and styrene, butadiene and acrylonitrile, butadiene and isobutylene, isoprene and isobutylene, polyisoprene and elastomeric acrylic polymers; and (2) at least one plastomer selected from the group consisting of polyvinyl chloride, polyvinyl acetate, polystyrene, copolymers of vinyl acetate and vinyl stearate, ethylcellulose, cellulose acetate, poly(ethyl methacrylate), poly(butyl methacrylate), poly(acrylonitrile), poly(glycol adipate), poly(diglycol sebacate), poly(ethylol propane succinate), poly(glycol itaconate);
and a non-thermoplastic adhesive.

6. A product according to claim 5 wherein said thermoplastic resin component comprises a mixture of resins exhibiting plastomeric and elastomeric properties.

7. A product according to claim 5 wherein said thermoplastic resin component is present in an amount within the range of 10 to 40 parts per 100 parts of said clay, and said non-thermoplastic adhesive being present in an amount within the range of up to 12 parts per 100 parts of said clay.

8. A product according to claim 1, comprising further a non-thermoplastic adhesive selected from the group consisting of casein, albumin, soya protein, starch polyvinyl alcohol and carboxymethyl cellulose.

9. A product according to claim 2, wherein said thermoplastic resin component is present in an amount within the range of 12–15 parts per 100 parts of said pigment, and said non-thermoplastic adhesive is present in an amount within the range of from 3 to 8 parts per 100 parts of said pigment.

10. A product according to claim 5, wherein said non-thermoplastic adhesive is a material selected from the group consisting of casein, albumin, soya protein, starch, polyvinyl alcohol and carboxymethyl cellulose.

11. A product according to claim 5, wherein said thermoplastic resin component is present in an amount within the range of 10 to 40 parts per 100 parts of said clay, and said non-thermoplastic adhesive being present in an amount within the range of up to 12 parts per 100 parts of said clay.

References Cited by the Examiner
UNITED STATES PATENTS

| | | | |
|---|---|---|---|
| 2,158,987 | 5/1939 | Maloney | 106—288 |
| 2,537,114 | 1/1951 | Young et al. | 260—8 |
| 2,651,580 | 9/1953 | Reilly | 260—8 |
| 2,685,571 | 8/1954 | Stinchfield | 260—8 |
| 3,028,258 | 5/1962 | Rice | 117—64 |

OTHER REFERENCES

"Pigments for Paper Coating," published by Tech. Assoc. of Pulp and Paper Industry, pp. 44–45, 1948.

SAMUEL H. BLECH, *Primary Examiner.*

WILLIAM H. SHORT, LOUISE P. QUAST, JAMES A. SEIDLECK, ALFONSO D. SULLIVAN, *Examiners.*

J. ZIEGLER, J. NORRIS, *Assistant Examiners.*